United States Patent
Udupi et al.

(10) Patent No.: US 9,979,647 B2
(45) Date of Patent: May 22, 2018

(54) PERIODIC ADVERTISEMENTS OF HOST CAPABILITIES IN VIRTUAL CLOUD COMPUTING INFRASTRUCTURE

(71) Applicant: CISCO TECHNOLOGY, INC., San Jose, CA (US)

(72) Inventors: Yathiraj B. Udupi, San Jose, CA (US); Debojyoti Dutta, Santa Clara, CA (US); Lewis W. Tucker, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 471 days.

(21) Appl. No.: 14/541,524

(22) Filed: Nov. 14, 2014

(65) Prior Publication Data

US 2016/0142336 A1   May 19, 2016

Related U.S. Application Data

(63) Continuation-in-part of application No. 14/540,752, filed on Nov. 13, 2014.

(51) Int. Cl.
*H04L 29/08* (2006.01)
*H04L 12/743* (2013.01)
(Continued)

(52) U.S. Cl.
CPC ........ *H04L 45/7453* (2013.01); *G06F 9/5077* (2013.01); *H04L 41/0813* (2013.01);
(Continued)

(58) Field of Classification Search
CPC . H04L 41/0813; H04L 45/7453; H04L 67/10; H04L 41/0853; H04L 47/762; G06F 9/5077
See application file for complete search history.

(56) References Cited

U.S. PATENT DOCUMENTS

2004/0220933 A1* 11/2004 Walker ................... G06F 9/466
2010/0242045 A1*  9/2010 Swamy .................. G06F 9/455
                                                                    718/104

(Continued)

OTHER PUBLICATIONS

U.S. Appl. No. 14/540,752, filed Nov. 13, 2014, entitled "Periodic Advertisements of Host Capabilities in Virtual Cloud Computing Infrastructure," Inventors: Yathiraj B. Udupi et al.

(Continued)

*Primary Examiner* — Kim T Nguyen
(74) *Attorney, Agent, or Firm* — Polsinelli PC

(57) ABSTRACT

The present disclosure describes a distributed, advertisement-based, solution for scheduling virtual resources in cloud infrastructures such as the OpenStack. The scheduling algorithm distributes the scheduling requirements and host state feasibility checks to the individual hosts in the datacenter, which can periodically send a summarized advertisement to the scheduler controller listing the number of instances of different type(s) of virtual resources that a particular host can support. The scheduler controller, thus no longer has to compute and maintain individual host states, and the scheduling problem is reduced to selecting the feasible advertisements that satisfy a given request. The solution can be extended to a scenario of multiple scheduler controllers using the same distributed, advertisement-based, approach.

20 Claims, 7 Drawing Sheets

(51) Int. Cl.
H04L 12/24 (2006.01)
H04L 12/923 (2013.01)
G06F 9/50 (2006.01)
H04L 29/06 (2006.01)

(52) U.S. Cl.
CPC ........ *H04L 41/0853* (2013.01); *H04L 47/762* (2013.01); *H04L 67/10* (2013.01); *H04L 67/32* (2013.01); *H04L 67/327* (2013.01); *H04L 69/24* (2013.01)

(56) References Cited

U.S. PATENT DOCUMENTS

| | | | |
|---|---|---|---|
| 2014/0215073 A1* | 7/2014 | Dow | ............ H04L 67/10 709/226 |
| 2016/0142257 A1 | 5/2016 | Udupi et al. | |

OTHER PUBLICATIONS

Babcock, Charles, "IBM Builds a Better OpenStack Scheduler," InformationWeek, Jan. 8, 2014; 5 pages; http://www.informationweek.com/cloud/infrastructure-as-a-service/ibm-builds-a-better-openstack-scheduler/d/d-id/1113355.

Cao, Bin, "What can you do with IBM Platform Resource Scheduler on OpenStack?" Thoughts on Cloud, IBM Cloud Products and Services, Aug. 29, 2014; 2 pages; http://thoughtsoncloud.com/2014/08/can-ibm-platform-resource-sheduler-openstack/.

"IBM Platform Resource Scheduler V2.1 optimizes the use of OpenStack infrastructure resources," IBM United States Software Announcement 213-590, International Business Machines Corporation, Dec. 10, 2013, 11 pages; http://www-01.ibm.com/common/ssi/rep_ca/0/897/ENUS213-590/ENUS213-590.PDF.

"Filter Scheduler," OpenStack Cloud Software, OpenStack Foundation; First published on or about Aug. 10, 2012, 6 pages; http://docs.openstack.org/developer/nova/devref/filter_scheduler.html.

"IBM Cloud Orchestrator," Cloud and IT Optimization, IBM Software Products, International Business Machines Corporation, 3 pages; Retrieved and printed on Nov. 10, 2014 from http://www-03.ibm.com/software/products/en/ibm-cloud-orchestrator.

USPTO Nov. 3, 2016 Non-Final Office Action from U.S. Appl. No. 14/540,752.

* cited by examiner

| SPREADING POLICY – VM REQUEST (TINY, 10) | |
|---|---|
| HOST | NUMBER OF TINY INSTANCES |
| HOST-1.XYZ.COM | 5 |
| HOST-2.XYZ.COM | 4 |
| HOST-3.XYZ.COM | 1 |

FIGURE 4

| STACKING POLICY – VM REQUEST (TINY, 10) | |
|---|---|
| HOST | NUMBER OF TINY INSTANCES |
| HOST-1.XYZ.COM | 10 |
| HOST-2.XYZ.COM | 0 |
| HOST-3.XYZ.COM | 0 |

FIGURE 5

| RANDOM POLICY – VM REQUEST (TINY, 10) | |
|---|---|
| HOST | NUMBER OF TINY INSTANCES |
| HOST-1.XYZ.COM | 3 |
| HOST-2.XYZ.COM | 6 |
| HOST-3.XYZ.COM | 1 |

FIGURE 6

| TYPE | HOST ADVERTISMENT SORTED LIST |
|---|---|
| TINY | [{HOST-1.XYZ.COM, TINY, 100, ACTIVE}, {HOST-2.XYZ.COM, TINY, 10, ACTIVE}, {HOST-3.XYZ.COM, TINY, 1, ACTIVE}] |
| HUGE | [{HOST-4.XYZ.COM, HUGE, 10, ACTIVE}, {HOST-2.XYZ.COM, HUGE, 5, ACTIVE}, {HOST-1.XYZ.COM, HUGE, 2, ACTIVE}] |

PERIODIC ADVERTISEMENTS OF HOST CAPABILITIES IN VIRTUAL CLOUD COMPUTING INFRASTRUCTURE

CROSS-REFERENCE TO RELATED APPLICATIONS

This application is a continuation (and claims the benefit under 35 U.S.C. § 120) of U.S. application Ser. No. 14/540,752, filed Nov. 13, 2014, by Yathiraj B. Udupi, et al. entitled "PERIODIC ADVERTISEMENTS OF HOST CAPABILITIES IN VIRTUAL CLOUD COMPUTING INFRASTRUCTURE." The disclosure of the prior application is considered part of (and is incorporated by reference in) the disclosure of this application in its entirety.

TECHNICAL FIELD

This disclosure relates in general to the field of computing and, more particularly, to periodic advertisements of host capabilities in virtual cloud computing infrastructure.

BACKGROUND

Distributed computing, a field in modern computing, involves processing large data sets in a distributed fashion over many different physical hosts in a data center or in some cases, over many hosts spread over multiple locations and connected over a network. With technical advances in virtual computing, many of the distributed tasks are performed by virtual resources created on these physical hosts. Scheduling virtual resources to perform these distributed tasks in virtual cloud infrastructures such as OpenStack is an important problem. Typically, scheduling involves creating virtual resources from a constrained, limited set of physical compute, storage, and network resources. For instance, compute scheduling involves determining where to create or instantiate a virtual resource (or referred herein as "virtual resource placements") on a physical hypervisor or host available from a pool of hosts available in the datacenter.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 shows an exemplary hash table comprising advertisements of host capabilities, according to some embodiments of the disclosure;

FIG. 4 shows exemplary VM placements as a result of a spreading policy, according to some embodiments of the disclosure;

FIG. 5 shows exemplary VM placements as a result of a stacking policy, according to some embodiments of the disclosure;

FIG. 6 shows exemplary VM placements as a result of a random policy, according to some embodiments of the disclosure;

DETAILED DESCRIPTION OF EXAMPLE EMBODIMENTS

Overview

Figure 1:
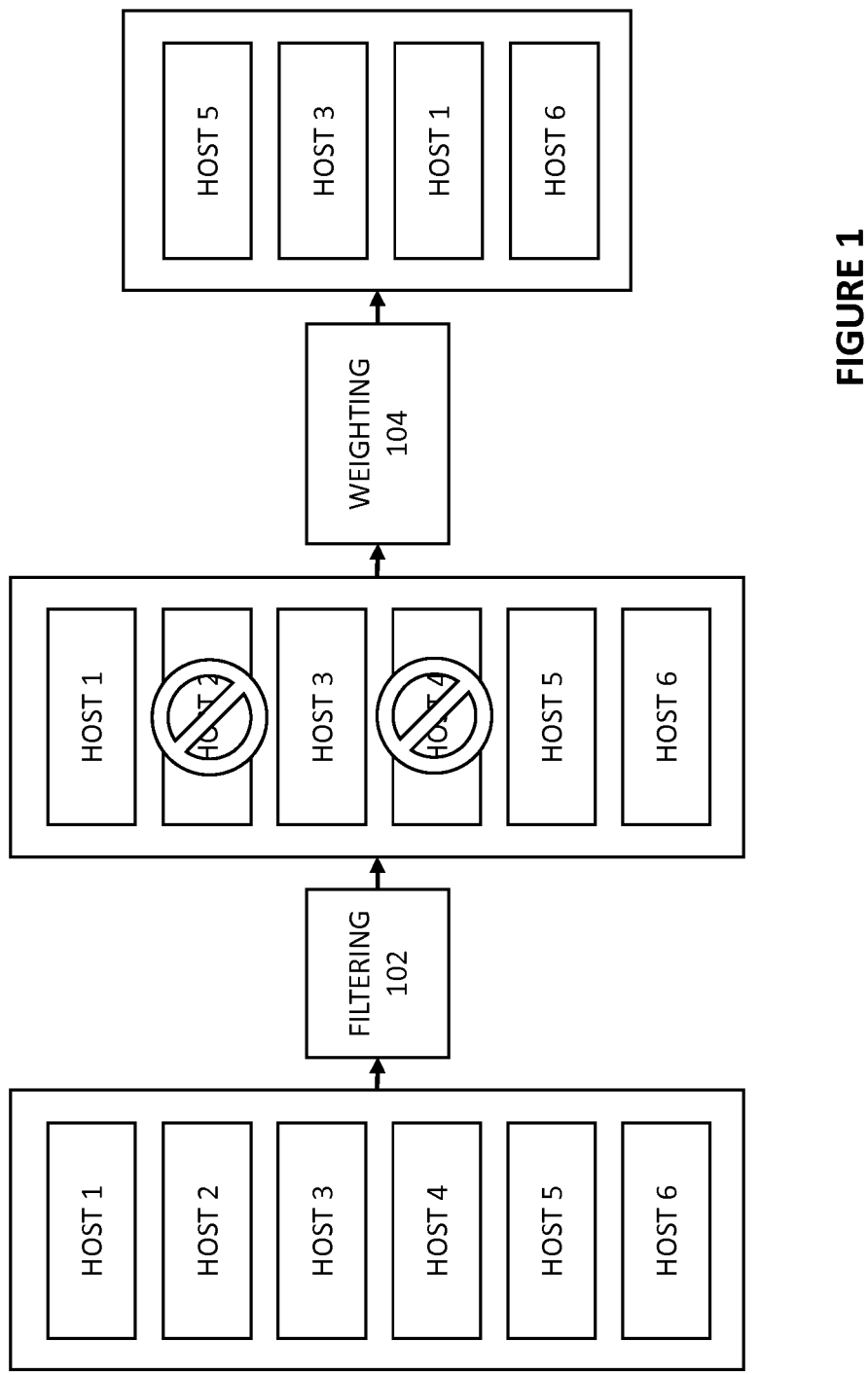
FIG. 1 shows an exemplary scheduler for a virtual cloud computing infrastructure.

The present disclosure describes a distributed, advertisement-based, solution for scheduling virtual resources in cloud infrastructures such as the OpenStack. The scheduling algorithm distributes the scheduling requirements and host state feasibility checks to the individual hosts in the datacenter, which can periodically send a summarized advertisement to the scheduler controller listing the number of instances of different type(s) of virtual resources that a particular host can support. The scheduler controller, thus no longer has to compute and maintain individual host states, and the scheduling problem is reduced to selecting the feasible advertisements that satisfy a given request. The solution can be extended to a scenario of multiple scheduler controllers using the same distributed, advertisement-based, approach.

Various embodiments for advertising capabilities of a host to one or more scheduler controllers of a virtual cloud computing platform are disclosed. These embodiments are associated with one or more hosts.

In some embodiments, an advertisement agent of the host generates one or more advertisements of host capabilities, wherein each one of the advertisements identifies a type of virtual resource and a number of instances of the type of virtual resource that the host is capable of creating. The advertisement agent further transmits, to the one or more scheduler controllers, the one or more advertisements of host capabilities.

In some embodiments, the advertisement agent summarizes the capabilities of the host by generating the one or more advertisements of host capabilities. The summaries help the scheduler controller to quickly make scheduling decisions. The generating of the one or more advertisements comprises checking available resources of the host, and deriving the one or more advertisements based on the available resources.

In some embodiments, the advertisement agent provides locks to ensure host states are consistent. The advertisement agent can transmit a first request to a first scheduler controller to acquire a first lock on advertisement(s) associated with the host on the first scheduler controller prior to transmitting the one or more advertisements. The advertisement agent is further configured to transmit a second request to release the first lock after transmitting the one or more advertisements.

In some embodiments, the advertisement agent provides locks to ensure host states are consistent across multiple scheduler controllers. The advertisement agent can transmit a first request to a first scheduler controller to acquire a first lock on advertisement(s) associated with the host on the first scheduler controller and a second request to a second scheduler controller to acquire a second lock on advertisement(s) associated with the host on the second scheduler controller prior to transmitting the one or more advertisements. The advertisement agent can further transmit a third request to release the first lock and a fourth request to release the second lock after transmitting the one or more advertisements.

In some embodiments, the updating of the host states and thus generation of (new) advertisements is triggered by a timer and/or by the creation of a virtual resource on the host. Advantageously, the advertisement agent autonomously updates host states and ensures the scheduler controller is notified (using the new advertisements) when host states change.

Various embodiments for processing capabilities advertisements at a first scheduler controller for virtual resource placement on a virtual cloud computing platform are also disclosed. These embodiments are associated with one or more scheduler controllers.

In some embodiments, a first advertisement manager of the first scheduler controller receives advertisements of host capabilities from a plurality of hosts, wherein each one of the advertisements received from a particular host identifies a type of virtual resource and a number of instances of the type of virtual resource that the particular host is capable of creating. Furthermore, a first scheduler of the first scheduler controller determines virtual resource placements based on the received advertisements of host capabilities.

To simplify the scheduling process into a selection process, the first advertisement manager can store the received advertisements of host capabilities in a hash table, wherein the advertisements of host capabilities are hashed by the type of virtual resource. When a request is received, the first scheduler can determine a type of virtual resource and a number of instances of the type of virtual resource to be created for a virtual resource creation request, and the first advertisement manager can (easily) determine the virtual resource placements for the type of virtual resource using the hash table. In some embodiments, the advertisements of host capabilities for a particular type of virtual resource are sorted by the number of instances of the particular type of virtual resource that hosts are individually capable of creating.

One or more features may be provided to ensure that the host states (advertisements) maintained at the scheduler controller are consistent and correct. In some embodiments, first advertisement manager may mark the advertisements of host capabilities as active (as opposed to "stale") when new advertisements are received and stored. Furthermore, in some embodiments, virtual resource placements comprises an assignment of a first host to create virtual resource(s) of a first type of virtual resource, and the first advertisement manager may acquire a first lock on an advertisement associated with the first host identifying the first type of virtual resource at the first scheduler controller. The first advertisement manager may also mark the advertisement associated with the first host identifying the first type of virtual resource at the first scheduler controller as stale. The first scheduler can transmit an order to the first host to create virtual resource(s) of the first type of virtual resource, and subsequently, release the first lock (e.g., using the first advertisement manager) in response to transmitting the order.

The above mentioned features extend to the scenario where there are multiple scheduler controllers. In some embodiments, the first advertisement manager transmits to a second scheduler controller, a request to acquire a second lock on an advertisement associated with the first host identifying the first type of virtual resource at a second scheduler controller. To make sure that an advertisement is used only once, the first advertisement manager may determine whether the advertisement associated with the first host identifying the first type of virtual resource at the second scheduler controller is stale (by querying the second scheduler controller). If the advertisement associated with the first host identifying the first type of virtual resource at the second scheduler controller is stale, the first scheduler controller (e.g., the first scheduler) can abort the virtual resource placement. If the advertisement associated with the first host identifying the first type of virtual resource at the second scheduler controller is not stale (=active), the first scheduler can transmit an order to the first host to create virtual resource(s) of the first type of virtual resource. The first advertisement manager can also then transmit to the second scheduler controller, a request to release the second lock in response to transmitting the order.

Example Embodiments

Challenges with Scheduling Solutions

Scheduling in virtual cloud environments involves creating virtual resources from a constrained, limited set of physical compute, storage, and network resources. For instance, compute scheduling involves determining where to instantiate a virtual resource, e.g., where to create a virtual machine (VM) on a physical hypervisor or host available from a pool of available hosts in a data center.

FIG. 1 shows an exemplary scheduler for a virtual cloud computing infrastructure. The example shown is a filter scheduler provided on a single central controller. The filter scheduler supports filtering and weighting to decide where a new VM instance should be created. When a VM request is made, the filter scheduler makes the scheduling decision by going through a series of filters (denoted by filtering 102). To figure out the matching hosts for the VM request, the single central controller would maintain and use a repository of all the host states. The repository provides a static view of all the available hosts in the datacenter. The filter scheduler can create a dictionary of unfiltered hosts, then filters them using filter properties to provide a group of valid hosts. Then, the scheduler chooses hosts for the requested number of instances. When choosing the host, the scheduler may choose the most weighed host as determined by a weighing process (denoted by weighing 104). Accordingly, the scheduler can select the most suitable host from a group of valid hosts and append it to the list of selected hosts. Each time the filter scheduler chooses a host, the filter scheduler virtually consumes resources on the selected host and updates its repository. Subsequent selections can adjust accordingly. Accordingly, filter scheduler finds local list of acceptable hosts by repeated filtering and weighing while using and maintaining host capability information maintained in the repository. In the end, filter scheduler sorts selected hosts by their weight and provisions VM instances on them.

Such scheduling solutions often depend on a single central controller to keep track the host states of all the available hosts, and then figure out the best host that is suitable for the current request for a single or a set of virtual resources. Usually, the single central host controller queries the hosts for raw properties associated with the hosts, and the single central controller computes host states based on the raw properties (host states being information that is more easily usable by the scheduler for determining available and best hosts). In big datacenters with many host machines, scheduling can incur significant overhead when a main scheduling controller has to maintain all the host states. Besides maintaining host states, some scheduling implementations have often been considered to add significant delay due to the complicated procedure for scheduling the virtual resources based on the host states.

An Improved System Usable for Scheduling

To address some of the above mentioned issues, improved scheduler controller and improved hosts can be configured to: (1) arrive at scheduling decisions without relying on a single central controller maintaining all the host states, (2) distribute the "overhead" of determining what type of virtual machine the hosts can accommodate (and how many of a particular type of virtual machine a host can accommodate). The improved scheduler controller and improved hosts can decentralize the scheduling computations of host states (the computations that determines what type of virtual machine and how many of that type of virtual machine can be created on a particular host). Moreover, the improved scheduler controller can quickly determine virtual machine placements with only a small amount of overhead.

Within the context of the present disclosure, a host represents a network element in a data center (e.g., a physical server) that can create or instantiate virtual resources, including virtual machines (VMs). The present disclosure describes embodiments in relation to creation of VMs as an example. One skilled in the art would appreciate that the embodiments described herein is broadly applicable to scheduling and creating any suitable virtual resource (compute, network, storage, etc.) in a virtualized cloud infrastructure.

Figure 2:
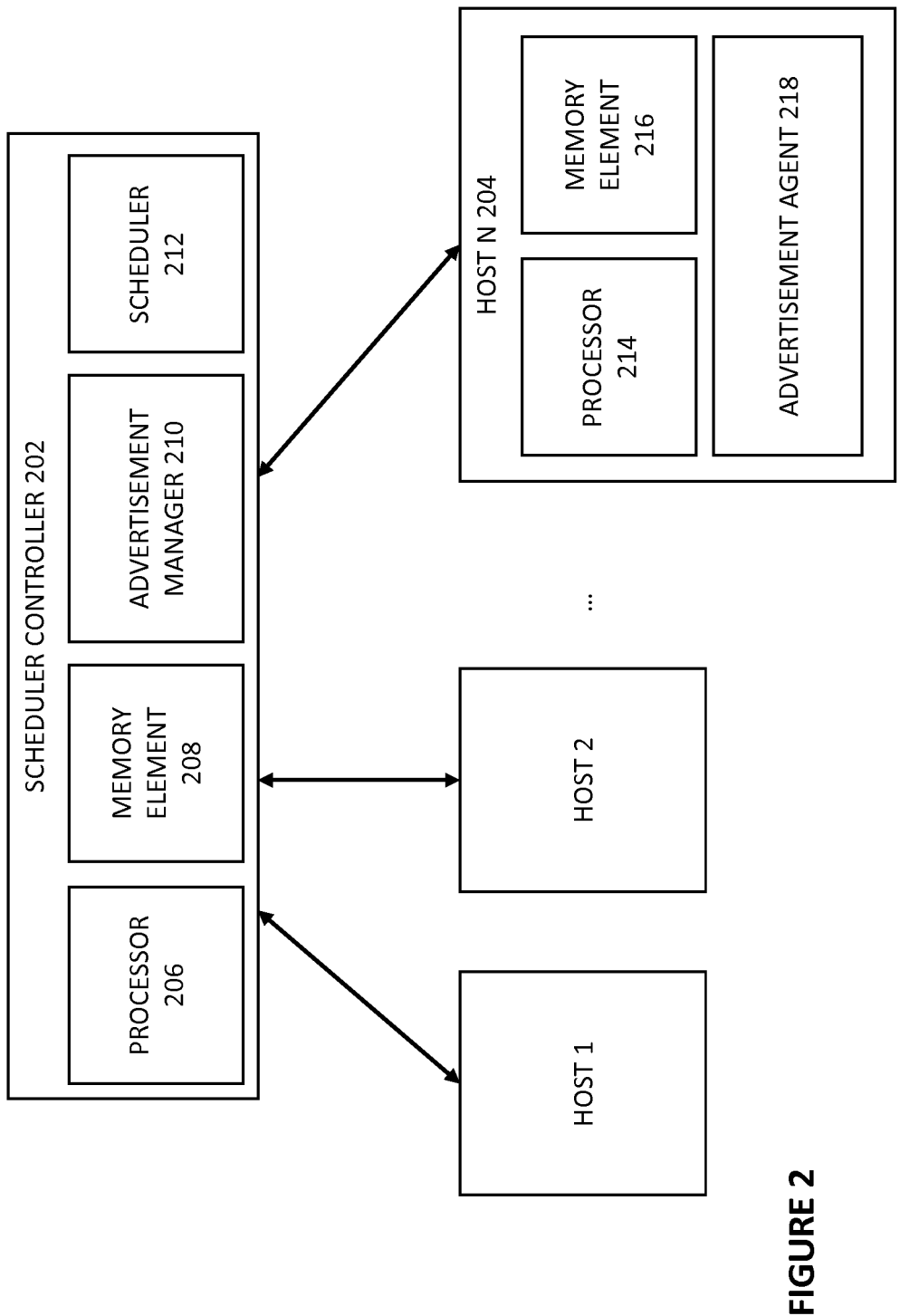
FIG. 2 shows an exemplary system configured for maintaining host states to facilitate scheduling, according to some embodiments of the disclosure.

FIG. 2 shows an exemplary system configured for maintaining host states to facilitate scheduling, according to some embodiments of the disclosure. The system shown includes a scheduler controller 202, and N hosts (having host 1, host 2, . . . and host N 204). Although not shown, there can be more than one scheduler controllers. The scheduler controller 202 is communicably connected to the N hosts.

The system advantageously provides a distributed scheduling solution that relies on host 1, host 2, . . . and host N 204 to send periodic advertisement of capabilities in a summarized form to the scheduler controller 202. The advertisements can be transmitted periodically or as needed. The scheduler controller 202 can be the controller node that receives the placement requests for VMs. The scheduler controller 202 can (simply) process and archive the periodic capability advertisements. In response to receiving a VM placement request, the scheduler controller 202 can select one or more archived advertisements that can satisfy or fulfill the placement request. Accordingly, the task of scheduling is reduced to just selecting the matching advertisements. Once the matching advertisements are selected, the scheduler controller 202 can send VM creation orders to the selected hosts based on the selected advertisements.

The distributed scheduling solution involves providing a distributed scheduler agent, e.g., advertisement agent 218 of host N 204, running on each of the hosts that can be used to instantiate VMs. The agent can periodically run a job to figure out the current capabilities of the host in terms of what type(s) of VMs and how many of each type of VM can be instantiated at a given point of time. Generally speaking, a VM request can specify a request for a VM of a particular type, say for example, a type "Tiny" can mean a VM with 1 virtual CPU (vCPU) core, 512 Megabytes (MB) of random access memory (RAM), 1 Gigabyte (GB) of hard disk storage. To facilitate scheduling, the advertisement agent running in each of the hosts can be configured to determine what type(s) and how many instance(s) of that a particular type can be instantiated in that host. For instance, the agent can perform a function to determine such information based on a list of supported types. Accordingly, the agent can take such information and compile the information into a list, e.g., one or more advertisements. The agent of the host can then send the advertisements periodically, or as needed to the scheduler controller. Effectively, the scheduler and host standardize the format of the host capabilities, where the format can be chosen specifically to match up with how VM placement requests are defined. Advantageously, such standardization makes it easier for the scheduler 212 of the scheduler controller 202 to decide where to instantiate the VMs.

In some embodiments, the exemplary host, host N 204, includes at least one memory element 216 for storing data and instructions and at least one processor 214 coupled to the at least one memory element 216. When the processor 214 executes the instructions stored in the memory element 216, the processor 214 can provide or implement an advertisement agent 218 that can carry out its respective functions as described herein. The advertisement agent 218 can implement a method for advertising capabilities of host N 204 to one or more scheduler controllers (e.g., scheduler controller 202) of a virtual cloud computing platform. The advertisement agent 218 of host N 204 can generate one or more advertisements of host capabilities, wherein each one of the advertisements identifies a type of VM and a number of instances of the type of VM that the host is capable of creating. Furthermore, the advertisement agent 218 can transmit the one or more advertisements of host capabilities to the one or more scheduler controllers (e.g., scheduler controller 202).

One exemplary advertisement can include an entry of the tuple form {hostname, type, num_of_supported_instances}. For instance, a plurality of advertisements can include [{HOST-N.XYZ.COM, TINY, 100}, {HOST-N.XYZ.COM, HUGE, 2}]

The scheduler controller 202 includes at least one memory element 208 for storing data and instructions and at least one processor 206 coupled to the at least one memory element 208. When the processor 206 executes the instructions stored in the memory element 208, the processor 206 can provide or implement an advertisement manager 210 and a scheduler 212 that can carry out their respective functions as described herein. In some embodiments, the scheduler controller 202 can carry out a method for processing capabilities advertisements for VM placement on a virtual cloud computing platform. The method includes receiving, at an advertisement manager 210 of the scheduler controller 202, advertisements of host capabilities from a plurality of hosts (e.g., host 1, host 2, . . . and host N 204). Each one of the advertisements received from a particular host can identify a type of VM and a number of instances of the type of VM that the particular host is capable of creating. The scheduler 212 of scheduler controller 202 can then determine VM placements based on the received advertisements of host capabilities.

The improved scheduler controller 202 and hosts (e.g., host 1, host 2, . . . and host N 204) coordinates scheduling through periodic advertisements. Accordingly, the computation of host capabilities is distributed over the plurality of hosts, so that the scheduler controller is no longer relied upon to perform such computation. Advantageously, the overhead for performing scheduling is reduced significantly.

Archiving the Advertisements and Selecting Advertisements for VM Placements

As explained above, one exemplary advertisement can include an entry of the tuple form: {hostname, type, num_of_supported_instances}. "hostname" uniquely identifies a particular host. "type" identifies one of the types of VM. "num_of_supported_instances" corresponds to the number of the types of VMs the particular host is capable of creating. The main scheduler controller archives all the advertisements received from each host in buckets hashed by the type. In other words, the advertisement manager (e.g., advertisement manager 210 of FIG. 2) can store the received advertisements of host capabilities in a hash table, wherein the advertisements of host capabilities are hashed by the type of VM.

In some cases, the advertisements of host capabilities for a particular type of VM are sorted by the number of instances of the particular type of VM that hosts are individually capable of creating (e.g., the advertisements in the bucket is sorted by the "num_of_supported_instances" count). For instance, the advertisement having the highest "num_of_supported_instances" count is positioned first in the list, while the advertisement having the lowest "num_of_supported_instances" count is positioned last in the list. Sorting may be advantageously in embodiments where scheduling may select advertisements in a particular order when fulfilling a VM creation request.

Upon receiving a VM creation request, the scheduler (e.g., scheduler 212 of FIG. 2) can determine a type of VM and a number of the type of VM to be created for a VM creation request. The advertisement manager (e.g., advertisement manager 210 of FIG. 2) can assist the scheduler in the VM placements for the type of VM using the hash table.

FIG. 3 shows an exemplary hash table comprising advertisements of host capabilities, according to some embodiments of the disclosure. In this example, there are two types: TINY and HUGE. For each type, there can be one or more entries of advertisements from various hosts. Exemplary entries for the type TINY includes: [{HOST-1.XYZ.COM, TINY, 100, ACTIVE}, {HOST-2.XYZ.COM, TINY, 10, ACTIVE}, {HOST-3.XYZ.COM, TINY, 1, ACTIVE}].

It is understood by one skilled in the art that any suitable type can be defined for the particular application. For instance, profiling can be performed to determine a plurality of types of VMs based on groupings of different VM creation requests (e.g., determine categorization where categories can be identified by a "type" label).

Status Flag for Archived Advertisements

In some embodiments, each advertisement is appended with a status flag, e.g., "active" or "stale" (or any other suitable flags), to indicate if the advertisement is usable at a particular point in time. This ensures that once capabilities are consumed for a particular host, the advertisement entry in the hash table is marked as "stale" to indicate that the advertisement is no longer up-to-date, and to prevent the capabilities advertised by the advertisement from being used more than once. As soon as a fresh advertisement comes from the host, the scheduler controller can archive them with an "active" flag, or mark the fresh advertisement as "active." The "stale" flag is set when the scheduler selects an advertisement and/or sends a VM creation order to the respective host.

When selecting advertisements, a scheduler would generally select "active" advertisements only, or prior to selecting an advertisement, the scheduler may check to make sure the advertisement is "active."

When resources for a particular host are consumed, the advertisement(s) for the particular host can be updated by the scheduler controller (e.g., advertisement manager 210 of FIG. 2) with their status flag set to "stale." For instance, the scheduler controller (e.g., by advertisement manager 210 of FIG. 2) can mark the advertisement associated with the particular host identifying the particular type of VM at the scheduler controller as "stale." Stale advertisement(s) can be re-activated in response to receiving the next capability advertisement from the particular host (e.g., by advertisement manager 210 of FIG. 2). For instance, a stale advertisement can be replaced by an updated advertisement marked as "active." When the status flag is "stale", that advertisement cannot be used by the scheduler controller for any other request, thus ensuring the capabilities in the advertisement will not be used for subsequent requests that might not be feasible.

Details of the "active" and "stale" flag is described in further detail in later sections of the present disclosure.

Exemplary Distribution Policies for Selecting Advertisements to Determine VM Placements In some embodiments, a VM creation request can request one or more types of VMs to be created and indicate the number of instances required for each type of VM to be created. For instance, the request can be represented as a tuple {type, num_of_required_instances}. In other words, the VM creation request can specify a type of VM, and a number of instances of the type of VM to be created.

The archived advertisements in the hash table advantageously allow a simple workflow for VM scheduling to be implemented in the scheduler controller. When a scheduler controller receives a compute placement request, e.g., having the tuple {type, num_of_required_instances}, and the scheduler controller can simply retrieve the (sorted) advertisement list from the hash table for the requested type of VM ("type" in the compute placement request). Accordingly, the scheduler controller can fulfill the request from the advertisements (e.g., "active" advertisements) according to a suitable distribution policy, and the VM creation orders are subsequently sent to the selected hosts.

One exemplary distribution policy is a spreading policy. The spreading policy results in hosts being picked one by one, in a round-robin fashion through the list of sorted host advertisements, until all of the required instances of the requested type of VM are fulfilled. FIG. 4 shows exemplary VM placements as a result of a spreading policy, according to some embodiments of the disclosure. Based on a hash table shown in FIG. 3, for a VM request having a tuple (TINY, 10) requesting 10 instances of type TINY, the allocation using the spreading policy can result in the following distribution:

HOST-1.XYZ.COM to create 5 TINY instances,
HOST-2.XYZ.COM to create 4 TINY instances, and
HOST-3.XYZ.COM to create 1 TINY instance.

Another exemplary distribution policy is a stacking policy. Stacking policy selects all VM instances supported in a first host for the current request based on the first advertisement in the sorted list of advertisements before heading to the next host advertisement in the sorted list. For instance, the scheduler can select the sorted advertisement list for the given requested type from the hash table, and start fulfilling the required number of instances using all of the supported instances for the first advertisement, before attempting to fulfil the required number of instances with the next advertisement in the sorted list. The stacking policy continues to select supported instances until all the required instances of the request are fulfilled. FIG. 5 shows exemplary VM placements as a result of a stacking policy, according to some embodiments of the disclosure. Based on a hash table shown in FIG. 3, for a VM request having a tuple (TINY, 10) requesting 10 instances of type TINY, the allocation using the stacking policy can result in the distribution of: HOST-1.XYZ.COM to create 10 TINY instances (no TINY instances is to be created with the other hosts).

Yet another exemplary distribution policy is a random policy. Random policy selects hosts (e.g., the advertisements) at random to fulfill the requested instances in the VM request. FIG. 6 shows exemplary VM placements as a result of a random policy, according to some embodiments of the disclosure. Based on a hash table shown in FIG. 3, for a VM request having a tuple (TINY, 10) requesting 10 instances of type TINY, the allocation using the random policy can result in the following distribution:

HOST-1.XYZ.COM to create 3 TINY instances,
HOST-2.XYZ.COM to create 6 TINY instances, and
HOST-3.XYZ.COM to create 1 TINY instance.

The above examples merely illustrate some of the possible distribution policies, where some of the policies may be more suitable for a particular application than others. One skilled in the art would appreciate that other (pluggable) policies can be used by the scheduler in the scheduler controller to select hosts from the archived host advertisements.

Figure 7:
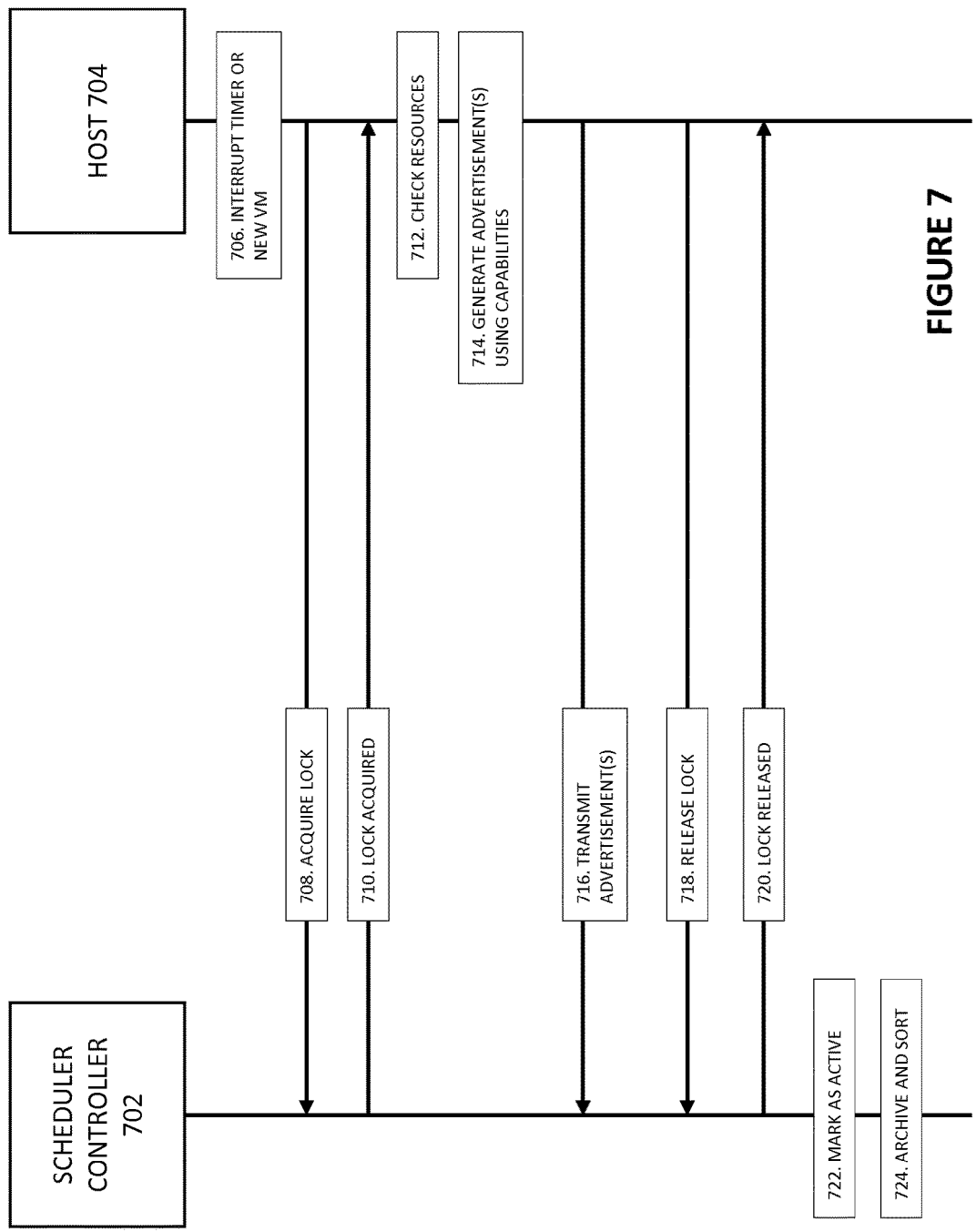
FIG. 7 shows an exemplary messaging diagram illustrating the process of advertising capabilities of a host to a scheduler controller of a virtual cloud computing platform, according to some embodiments of the disclosure.

Host can Advertise Capabilities and Scheduler Controller can Archive Capabilities FIG. 7 shows an exemplary messaging diagram illustrating the process for advertising capabilities of a host to a scheduler controller of a virtual cloud computing platform, according to some embodiments of the disclosure. In this example, an exemplary scheduler controller 702 and an exemplary host 704 can exchange messages. Scheduler controller 702 and/or host 704 may perform one or more steps.

In some embodiments, the improved hosts may periodically determine one or more advertisements of host capabilities, which can be sent to the scheduler controller. For instance, host 704 may generate the one or more advertisements of host capabilities by checking available resources of host 704 (box 712), and deriving the one or more advertisements based on the available resources (box 714). The deriving of the one or more advertisements may include determining one or more tuples specifying a type of virtual resource and a number of instances of the type of virtual resource that host 704 is capable of creating. Effectively, host 704 summarizes the available resources using the one or more tuples.

The determining or updating of advertisement(s) can be triggered based on a (configurable) time period such as an interrupt timer or an interrupt event at host 704 (e.g., a new VM being created on the host). In some cases, the host 704 may also be triggered to determine the one or more advertisements in response to receiving a VM order from scheduler controller 702 (due to resources being by the order). Hence, the host capabilities, and thus the advertisement(s) as well, are to be updated by host 704, and new advertisement(s) are transmitted from host 704 to the scheduler controller 702. The trigger is shown as box 706.

To ensure consistency of advertisements with the most current host capabilities, host 704 may acquire a lock on the advertisement to ensure that the scheduler controller does not attempt to fulfill a VM request using the advertisement or modify the advertisement archived in the hash table. Locking can allow hosts, e.g., host 704, to lock advertisements to make sure that advertisements associated with host 704 held by the scheduler controller 702 is unusable. Those advertisements being locked can prevent scheduler controller 702 from acting on the advertisements when the host is in the process of updating the advertisements. For instance, host 704 may transmit transmitting a first request to the scheduler controller 702 to acquire a lock on advertisement(s) associated with the host 704 on the scheduler controller 702 (message 708). The request can be transmitted prior to transmitting the one or more advertisements. The scheduler controller 702 may transmit a response to host 704 confirming the lock on advertisement(s) associated with host 704 has been acquired (message 710).

In response to receiving the response indicating the lock has been acquired (message 710), host 704 can transmit the one or more advertisements of host capabilities (message 716). After transmitting the one or more advertisements, host 704 may transmit a second request (message 718) to scheduler controller 702 to release the lock after transmitting the one or more advertisements. The scheduler controller 702 may transmit a response to host 704 confirming the lock has been removed (message 720).

The example shown in FIG. 7 can be implemented based on the following pseudocode example:

```
ALGORITHM send_advertisment {
    send_time_period_elapse = True
    while(send_time_period_elapsed OR new_VM_created) do:
        acquire_advertisements_lock_on_controller(scheduler_controller,
        host)
        advertisement_list = check_capabilities(host.states,
        list_of_supported_types)
        send(scheduler_controller, advertisement_list)
        release_advertisement_lock_on_controller(scheduler_controller,
        host)
        send_time_period_elapsed = False
        sleep_with_interrupt(send_time_period,
        interrupt_on(new_VM_created))
        send_time_period_elapsed = True
}
```

In response to receiving the one or more advertisements (message 716), scheduler controller 702 can mark the advertisement(s) as "active" (box 722) and archive the advertisement(s) in the hash table (box 724). In some cases, a sorting function is performed for the hash table to provide sorted lists of advertisements per each bucket in the hash table. In some other cases, an insertion function for archiving the advertisement(s) is provided such that an advertisement is inserted at a proper position in the list of sorted advertisements.

While only one host 704 is shown, one skilled in the art would appreciate that other similar hosts can be provided and configured to perform the functions illustrated in FIG. 7, each host transmitting advertisements to the scheduler controller 702. Each host can transmit the advertisements of capability tuple periodically with a configurable time period, and also sends updated advertisements each time the host has acted on a VM creation order.

Scheduler Processes VM Creation Requests Using Locks and a Hash Table

Figure 8:
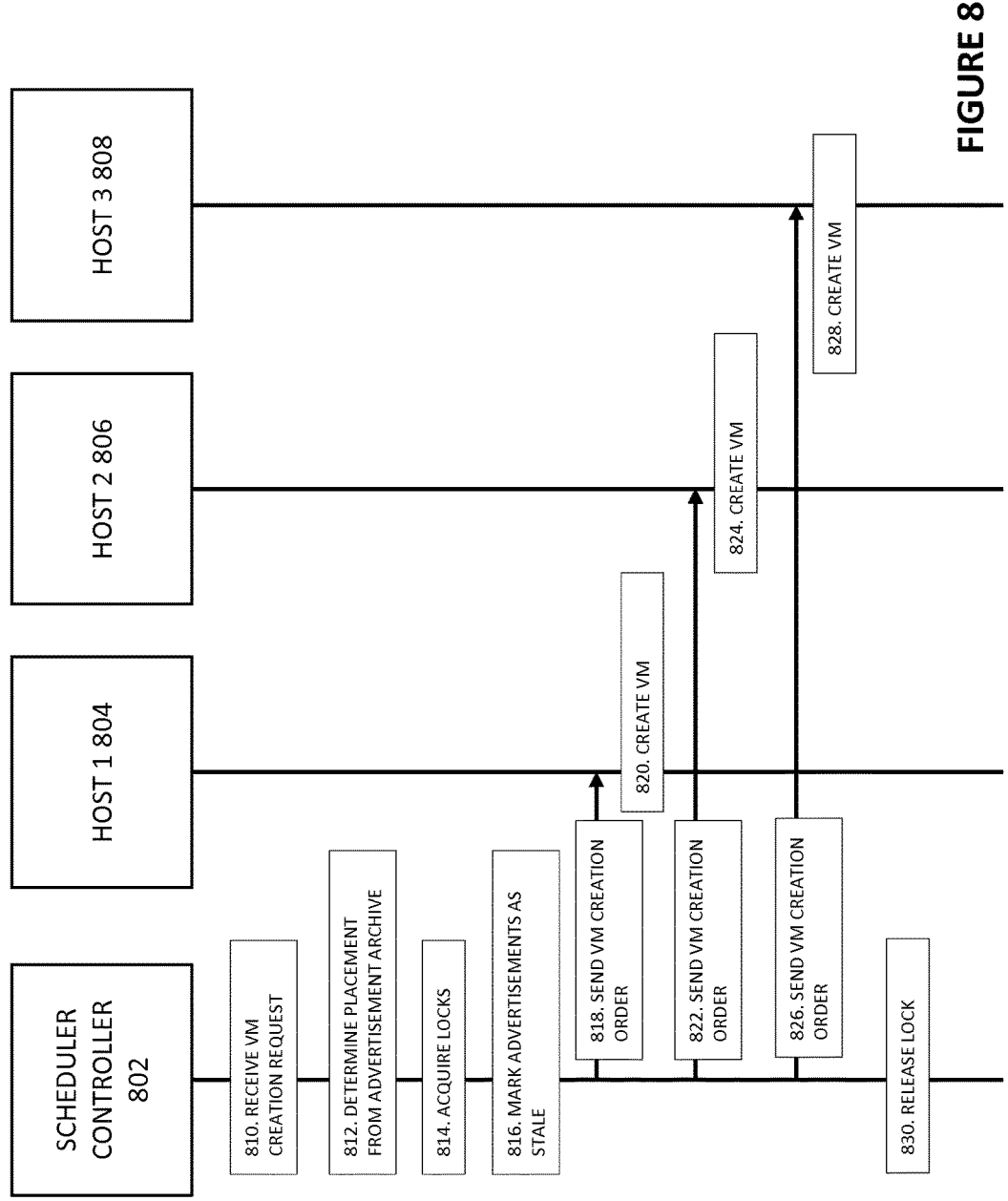
FIG. 8 shows an exemplary messaging diagram illustrating the processing of capabilities advertisements at a scheduler controller for VM placement on a virtual cloud computing platform, according to some embodiments of the disclosure.

FIG. 8 shows an exemplary messaging diagram illustrating the processing of capabilities advertisements at a scheduler controller for VM placement on a virtual cloud computing platform, according to some embodiments of the disclosure. In this example, messages can be transmitted and/or received at an exemplary scheduler controller 802 and one or more exemplary hosts, e.g., host 1 804, host 2 806, and host 3 808. One or more of scheduler controller 802, host 1 804, host 2 806, and host 3 808 may perform one or more steps.

The scheduling workflow begins with the scheduler controller 802 receiving a VM creation request (box 810). Using mechanisms disclosed herein, the scheduler controller 802 can determine VM placements from or based on the hash table of archived advertisements (box 812). For instance, a scheduler of scheduler controller 802 can determine a type of VM and a number of instances of the type of VM to be created for the VM creation request. Using an advertisement manager of scheduler controller 802, the VM placements for the type of VM for the VM creation request can be determined using the hash table.

Generally speaking, the VM placements include an assignment of a particular host to create VM(s) of a particular type of VM (e.g., host 1 804 to create 5 TINY instances). VM placements can include a plurality of such assignments. An advertisement of the particular host for the particular type of VM can be selected as a feasible candidate for fulfilling the VM creation request, if the advertisement indicates the particular host can create at least some of the instances of the type of VM requested in the VM creation request.

At this point, the scheduler controller 802 can prepare to transmit VM creation orders to one or more hosts. As an example, the scheduler controller 802 has determined from the hash table that the scheduler controller 802 is to fulfill the VM creation request by creating some instance(s) of a particular type of VM on host 1 804, host 2 806, and host 3 808.

Before transmitting VM creation orders, scheduler controller 802 (e.g., an advertisement manager of scheduler controller 802) can acquire a lock on an advertisement associated with a host identifying the type of virtual resource at the scheduler controller (box 814). For instance, the scheduler controller 802 can lock advertisements associated with host 1 804, host 2 806, and host 3 808, or lock advertisements associated with host 1 804, host 2 806, and host 3 808 for the particular type of VM to be created on the hosts. Locking can allow the scheduler controller 802 to lock advertisement(s) to make sure that advertisement(s) associated with one or more hosts held by the scheduler controller 802 is unusable for other scheduling processes.

Scheduler controller 802 (e.g., advertisement manager of the scheduler controller 802) can further mark an advertisement associated with the particular host identifying the particular type of virtual resource at the scheduler controller 802 as "stale" (box 816). For instance, the scheduler controller 802 can mark advertisements associated with host 1 804, host 2 806, and host 3 808 as "stale", or mark advertisements associated with host 1 804, host 2 806, and host 3 808 for the particular type of VM to be created on the hosts as "stale". Marking advertisements as stale ensures that the host capabilities advertised in the respective advertisements are not being consumed more than once.

The scheduler controller 802 can accordingly transmit VM creation orders to host 1 804, host 2 806, and host 3 808 (message 818, 822, and 826 respectively). Host 1 804, host 2 806, and host 3 808 can, in response, create VMs according to the VM creation orders (box 820, 824, 828 respectively). In some embodiments, the hosts can transmit a response to scheduler controller 802 to confirm the VM creation, if necessary. Furthermore, the creation of VMs can trigger host 1 804, host 2 806, and host 3 808 to update their advertisements by transmitting new advertisements to the scheduler controller 802. The scheduler controller 802 can release the lock(s) in response to the order(s) being transmitted to host 1 804, host 2 806, and host 3 808 (box 830).

The example shown in FIG. 8 can be implemented based on the following pseudocode example:

```
ALGORITHM send_VM_creation_order_to_host {
    acquire_advertisements_lock_on_controller(scheduler_controller, host)
    mark_capabilities_advertisements_as_stale(scheduler_controller, host)
    send_VM_creation_order(host)
    release_advertisement_lock_on_controller(scheduler_controller, host)
}
```

While the example shows three hosts, the system can include less or more hosts configured to perform the same or similar functions to host 1 804, host 2 806, and host 3 808. In some cases, less or more hosts are involved depending on the selection of advertisements during the scheduling process.

Transmitting Advertisements to Multiple Scheduler Controllers

The described improved scheduler controller and hosts involving advertisements of host capabilities can be extended to the situation with multiple scheduler controllers handing placement requests targeted towards a common pool of hosts. In this situation, each scheduler controller can independently receive placement requests for VMs (which can be broadcast from a particular host to multiple scheduler controllers), and the scheduler controllers may individually archive periodic advertisements of the hosts. To provide proper operation, the mechanisms described above can be extended to ensure that the capability advertisements are in sync across all the scheduler controllers, and that only one advertisement can be acted upon at a given time.

Figure 9:
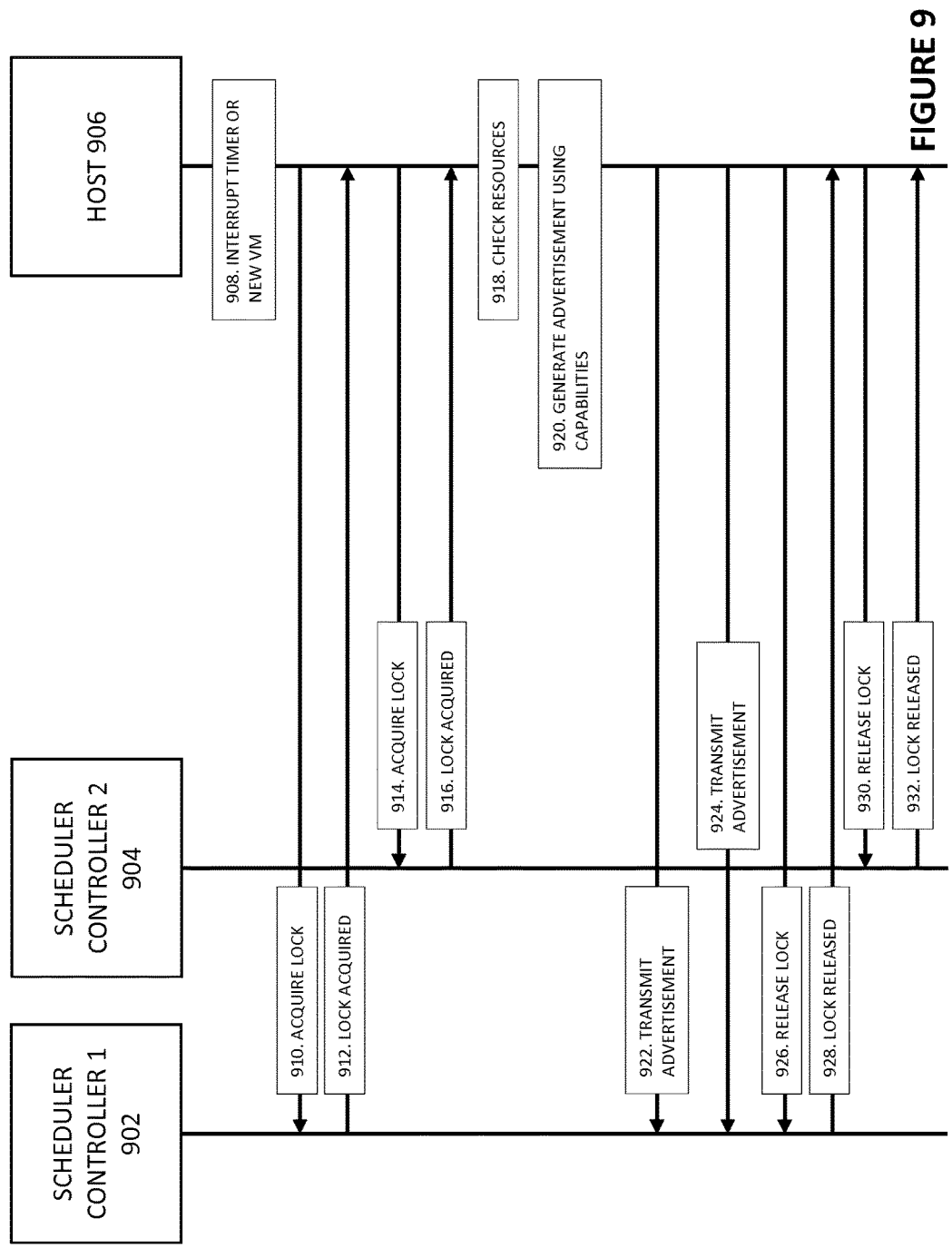
FIG. 9 shows an exemplary messaging diagram illustrating the process of advertising capabilities of a host to multiple scheduler controller of a virtual cloud computing platform, according to some embodiments of the disclosure.

FIG. 9 shows an exemplary messaging diagram illustrating the process of advertising capabilities of a host to multiple scheduler controller of a virtual cloud computing platform, according to some embodiments of the disclosure. In this example, messages can be transmitted and/or received at an exemplary scheduler controller 1 902, exemplary scheduler controller 2 904, and exemplary host 906. One or more of scheduler controller 1902, scheduler controller 2 904, and host 906 can perform one or more steps.

Similar to FIG. 7, the determining or updating of advertisement(s) can be triggered based on a (configurable) time period such as an interrupt timer (e.g., triggering periodically) or an interrupt event at host 906 (e.g., a new VM being created). The trigger is shown as box 908. When there are multiple scheduler controllers (e.g., scheduler controller 1 902, scheduler controller 2 904), an enhancement can be provided where host 906 acquires locks for its advertisements in all the scheduler controllers before transmitting a new capability advertisement, so that none of the scheduler controllers can act on their existing advertisements.

For instance, as seen in FIG. 9, host 906 can transmit a first request to scheduler controller 1 902 to acquire a lock on advertisement(s) associated with host 906 on the scheduler controller 1 902 (message 910) prior to transmitting the one or more (updated) advertisements. Host 906 can also transmit a second request to a scheduler controller 2 904 to acquire a lock on advertisement(s) associated with the host on the scheduler controller 2 904 (message 914) prior to transmitting the one or more updated advertisements. Scheduler controller 1 902 may transmit a response to host 906 to indicate that the lock has been acquired on scheduler controller 1 902 (message 912), and scheduler controller 2 904 may transmit a response to host 906 to indicate the lock has been acquired on scheduler controller 2 904 (message 916).

Once the locks are acquired, host 906 can check available resources of the host 906 (box 918), and generate/derive the one or more (updated) advertisements based on the available resources (box 920). Subsequently, host 906 can transmit the one or more advertisements to scheduler controller 1 902 and scheduler controller 2 904 (messages 922 and 924 respectively). Once the advertisement(s) are transmitted, host 906 can transmit a request to release the lock on scheduler controller 1 902 (message 926) and transmit a request to release the lock on scheduler controller 2 904 (message 930). Scheduler controller 1 902 can transmit a response to confirm that the lock on scheduler controller 1 902 has been released (message 928), and scheduler controller 2 904 can transmit a response to confirm the lock on scheduler controller 2 904 has been released (message 932).

The example shown in FIG. 9 can be implemented based on the following pseudocode example:

```
ALGORITHM send_advertisment_multiple_controllers {
  send_time_period_elapse = True
  while (send_time_period_elapsed OR new_VM_created) {
    for all scheduler_controllers: {
      acquire_advertisements_lock_on_controller(scheduler_controller, host)
    }
    advertisement_list = check_capabilities(host.states, list_of_supported_types)
    for all scheduler_controllers: {
      send(scheduler_controller, advertisement_list)
    }
    for all scheduler_controllers: {
      release_advertisement_lock_on_controller(scheduler_controller, host)
    }
    send_time_period_elapsed = False
    sleep_with_interrupt(send_time_period, interrupt_on(new_VM_created))
    send_time_period_elapsed = True
  }
}
```

While only one host 906 is shown, one skilled in the art would appreciate that other similar hosts can be provided and configured to perform the functions illustrated in FIG. 9, each host locking advertisements at the scheduler controllers before transmitting advertisements to the scheduler controllers. Each host can transmit the advertisements of capability tuple periodically with a configurable time period, and also sends updated advertisements each time the host has acted on a VM creation order. While only two scheduler controllers are shown (scheduler controller 1 902 and scheduler controller 2 904), further scheduler controllers can be provisioned with the same or similar functions.

Processing VM Creation Requests Using Locks and Hash Table when there are Multiple Scheduler Controllers With multiple scheduler controllers, additional locking mechanisms may be used to ensure that when one scheduler controller is in the process of selecting host advertisements and transmitting VM creation orders based on the capability advertisements, no other scheduler controller(s) can use that host, until the capability advertisements are active again. One exemplary mechanism for a scheduler controller to ensure that a selected host's capability advertisements are unusable by the other scheduler controller involves marking the status flag of the capability advertisements at other scheduler controller(s) for that host as "stale".

Figure 10:
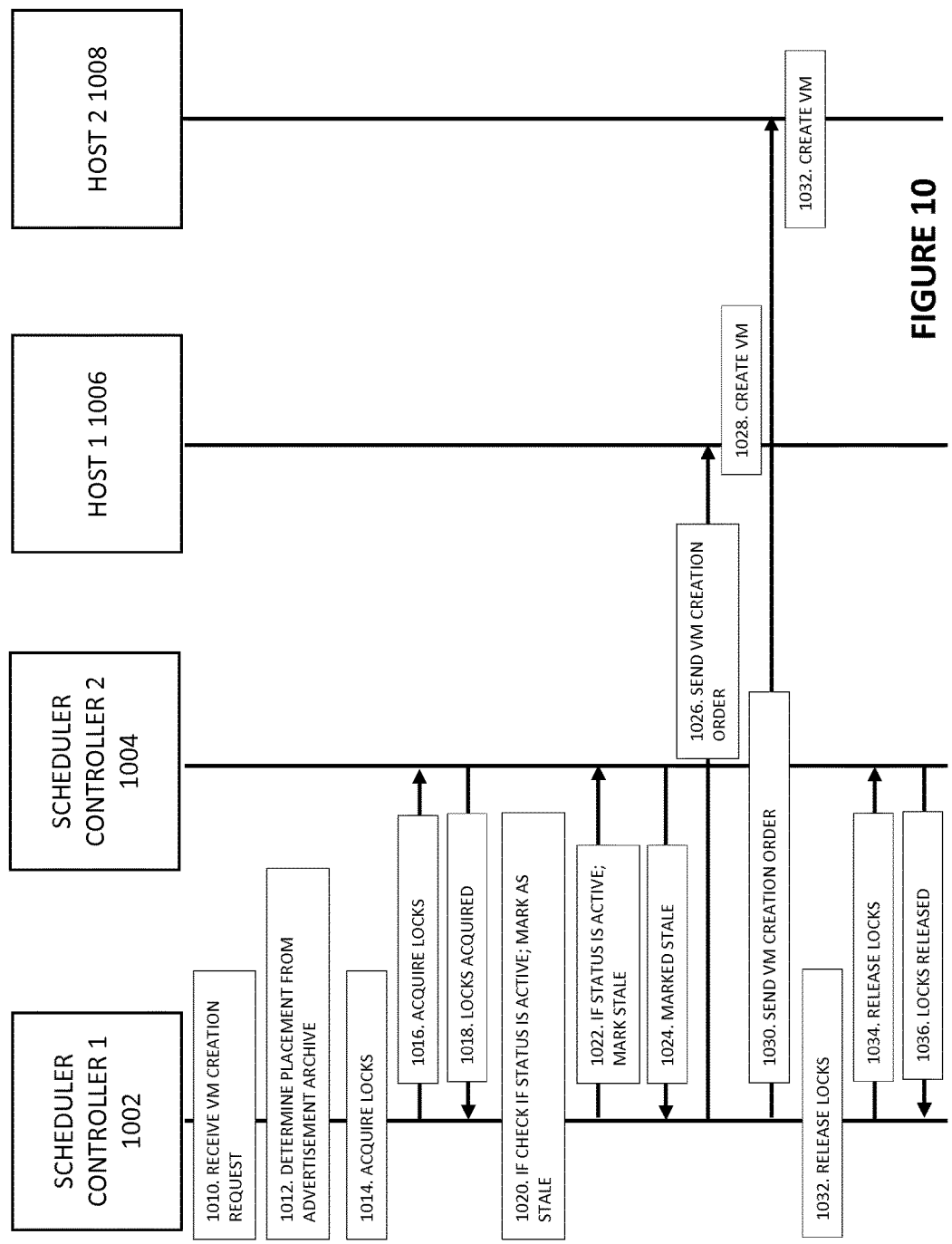
FIG. 10 shows an exemplary messaging diagram illustrating the processing of capabilities advertisements at a first scheduler controller for VM placement on a virtual cloud computing platform having multiple scheduler controllers, according to some embodiments of the disclosure.

FIG. 10 shows an exemplary messaging diagram illustrating the processing of capabilities advertisements at a first scheduler controller for VM placement on a virtual cloud computing platform having multiple scheduler controllers, according to some embodiments of the disclosure. In this example, messages can be transmitted and/or received at an exemplary scheduler controller 1 1002, exemplary scheduler controller 2 1004, exemplary host 1 1006, and exemplary host 2 1008. One or more of scheduler controller 1 1002, scheduler controller 2 1004, host 1, 1006, and host 2 1008 can perform one or more steps.

The scheduling workflow begins with the scheduler controller 1 1002 receiving a VM creation request (box 1010). Using mechanisms disclosed herein, the scheduler controller 1002 can determine VM placements from or based on the hash table of archived advertisements (box 1012). For instance, a scheduler of scheduler controller 1 1012 can determine a type of VM and a number of instances of the type of VM to be created for the VM creation request. At this point, the scheduler controller 1 1012 can prepare to transmit VM creation orders to one or more hosts. As an example, the scheduler controller 1 1012 has determined from the hash table that the scheduler controller 1 1012 is to fulfill the VM creation request by creating some instance(s) of a particular type of VM on host 1 1006, and host 2 1008.

Before transmitting VM creation orders, scheduler controller 1 1010 (e.g., an advertisement manager of scheduler controller 1 1012) can acquire a lock on an advertisement associated with a host identifying the type of virtual resource at the scheduler controller (box 1014). For instance, the scheduler controller 802 can lock advertisements associated with host 1 1006 and host 2 1008, or lock advertisements associated with host 1 1006 and host 2 1008 for the particular type of VM to be created on the hosts. Locking can allow the scheduler controller 1014 to lock advertisement(s) to make sure that advertisement(s) associated with one or more hosts held by the scheduler controller 1014 is unusable by other scheduling processes. Because there are multiple scheduler controllers, scheduler controller 1 1002 (e.g., an advertisement manager of scheduler controller 1 1002) is further configured to transmit a request to acquire locks on advertisements associated with host 1 1006 and host 2 1008 identifying the particular type of VM at scheduler controller 2 1004 (message 1016). The scheduler controller 2 1004 may transmit a message to scheduler controller 1 1002 to indicate that locks have been acquired (message 1018).

Besides performing locking at all the scheduler controllers, scheduler controller 1 1002 checks whether the statuses of the advertisements at scheduler controller 1 1002 for the particular VM associated with host 1 1006 and host 2 1008 are "active" (box 1020). Furthermore, scheduler controller 2 1004 checks whether the statuses of the advertisements at scheduler controller 2 1004 for the particular VM associated with host 1 1006 and host 2 1008 are "active" (box 1020). If all of these advertisements are "active", scheduler controller 1 1002 marks the advertisements as "stale" at both scheduler controller 1 1002 (via message 1020) and scheduler controller 2 1004 (via message 1022). Scheduler controller 2 1004 may transmit a response to indicate that the advertisements have been marked as "stale" (message 1024).

If the checks of box 1020 and message 1022 determine that any of the advertisements is marked as "stale", the procedure may abort or return to a state where a scheduler may attempt to select feasible advertisements again. Scheduler controller 1 1002 and/or scheduler controller 2 1004 may update their own archived advertisements and mark the corresponding advertisement as "stale" to prevent the advertisement from selected again. For instance, scheduler controller 1 1002 determines an advertisement associated with host 1 1006 at scheduler controller 2 1004 is marked as "stale", it is an indication that the capability cannot be consumed again (another scheduler controller may have consumed the capability already). The virtual machine placement process may abort. If the process aborts because of another scheduler controller having acted on that advertisement already, and that advertisement is yet to be updated, the scheduler controller, which is attempting to perform virtual machine placement, may return to re-evaluate if any other host capability advertisement is feasible for fulfilling the VM creation request.

Scheduler controller 1 1002 (e.g., advertisement manager of the scheduler controller 1002) can further mark advertisements associated with host 1 1006 and host 2 1008 identifying the particular type of virtual resource at the scheduler controller 1 1002 as "stale" (box 1020), if it is determined the advertisements are "active". For instance, the scheduler controller 1 1002 can mark advertisements associated with host 1 1006 and host 2 1008 as "stale", or mark advertisements associated with host 1 1006 and host 2 1008 for the particular type of VM to be created on the hosts as "stale". Marking advertisements as stale ensures that the host capabilities advertised in the respective advertisements are not being consumed more than once. Likewise, scheduler controller 1 1002 (e.g., advertisement manager of the scheduler controller 1002) can further mark advertisements associated with host 1 1006 and host 2 1008 identifying the particular type of virtual resource at the scheduler controller 2 1004 as "stale" (via message 1022), if it is determined the advertisements are "active". Scheduler controller 2 1004 may transmit a response to scheduler controller 1 1002 indicating the advertisements have been marked as "stale" (message 1024).

Accordingly, scheduler controller 1 1002 can then transmit a VM creation order to host 1 1006 (message 1026), such that host 1 1006 can create one or more VMs according to the order (box 1028). For instance, host 1 1006 can create one or more instances of a particular type of VM according to the order. Furthermore, scheduler controller 2 1004 can transmit a VM creation order to host 2 1008 (message 1030), such that host 2 1008 can create one or more VMs according to the order (box 1032). For instance, host 2 1008 can create one or more instances of a particular type of VM according to the order. Host 1 1006 and host 2 1008 can transmit responses to scheduler controller 1 1002 that the instances of the VMs have been created according to the orders.

After the VM creation orders are transmitted, scheduler controller 1 1002 can release the locks on the selected advertisements on scheduler controller 1 1002 (box 1032). Furthermore, scheduler controller 1 1002 (e.g., an advertisement manager of scheduler controller 1 1002) can transmit a request to scheduler controller 2 1004 to release the locks placed on the selected advertisements at the scheduler controller 2 1004 (message 1034). Scheduler controller 2 1004 can transmit a response to scheduler controller 1 1002 to indicate that the locks have been released (message 1036).

The example shown in FIG. 10 can be implemented based on the following pseudocode example:

```
ALGORITHM send_VM_creation_order_to_host_enhanced {
    for all scheduler_controllers: { #comment: including itself
        acquire_advertisements_lock_on_controller(scheduler_controller, host)
    }
    for all scheduler_controllers: {
        if(capabililty_advertisement_status(scheduler_controller, host) is not stale: {
            mark_capabilities_advertisements_as_stale(scheduler_controller, host)
        } else {
            abort and ignore this host for the current request
            #comment: Some other controller has already acted on this host
        }
    }
    send_VM_creation_order(host)
    for all scheduler_controllers: {
        release_advertisement_lock_on_controller(scheduler_controller, host)
    }
}
```

While only two scheduler controllers are shown (scheduler controller 1 1002 and scheduler controller 2 1004), less or more scheduler controllers can be provisioned with the same or similar functions. Moreover, the system can include further hosts configured to perform the same or similar functions to host 1 1006 and host 2 1008.

Technical Advantages

One distinguishing feature of the embodiments disclosed herein is the scheduling is effectively distributed over many hosts, thus, removing some overhead from a main scheduler controller (by alleviating the need for the main scheduler to compute and maintain all the host states). Another distinguishing feature is that the summarization of host capabilities in advertisements reduces the time burden of scheduling because the selection of host capabilities to fulfill a VM creation order is made simpler.

Not only the embodiments can provide the above mentioned features, the disclosed embodiments include mechanisms that can ensure the advertisements are accurate and reflect the current host capabilities. Furthermore, the embodiments include mechanisms to ensure a re-advertisement is triggered each time after a host is selected and consumed after a round of scheduling.

VARIATIONS AND IMPLEMENTATIONS

Within the context of the disclosure, a network within a virtual cloud infrastructure can interconnect the scheduler controllers and hosts described herein. The network used herein represents a series of points, nodes, or network elements of interconnected communication paths for receiving and transmitting packets of information that propagate through a communication system. A network offers communicative interface between scheduler controllers and hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' is meant to encompass any of the aforementioned scheduler controllers and hosts, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the periodic advertisements and scheduling operations thereof. This may be inclusive of appropriate algorithms and communication protocols that allow for the effective exchange of data or information.

In one implementation, scheduler controllers and hosts described herein may include software to achieve (or to foster) the functions discussed herein for periodic advertisements and scheduling where the software is executed on one or more processors to carry out the functions. This could include the implementation of instances of advertisement manager, scheduler, advertisement agent and/or any other suitable element that would foster the activities discussed herein. Additionally, each of these elements can have an internal structure (e.g., a processor, a memory element, etc.) to facilitate some of the operations described herein. In other embodiments, these functions for periodic advertisements and scheduling may be executed externally to these elements, or included in some other network element to achieve the intended functionality. Alternatively, scheduler controllers and hosts may include software (or reciprocating software) that can coordinate with other network elements in order to achieve the periodic advertisements and scheduling functions described herein. In still other embodiments, one or several devices may include any suitable algorithms, hardware, software, components, modules, interfaces, or objects that facilitate the operations thereof.

In certain example implementations, the periodic advertisements and scheduling functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as host capability advertisements and hash tables as disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving periodic advertisements and scheduling, as outlined herein. Additionally, each of these devices may include a processor that can execute software or an algorithm to perform the periodic advertisements and scheduling activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of periodic advertisements and scheduling, as potentially applied to a myriad of other architectures.

It is also important to note that the steps in FIGS. 7-10 illustrate only some of the possible scenarios that may be executed by, or within, the scheduler controllers and hosts described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by scheduler controllers and hosts in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for processing capabilities advertisements at a first scheduler controller for virtual resource placement on a virtual cloud computing platform, the method comprising:
    receiving, at a first advertisement manager of the first scheduler controller, an advertisement of host capabilities from a first host among a plurality of hosts, wherein the advertisement received from the first host identifies a type of virtual resource and a number of instances of the type of virtual resource that the first host is capable of creating; and
    determining, by the first advertisement manager, whether the advertisement at the first scheduler controller is stale or active;
    querying, by the first advertisement manager, a second scheduler controller to determine whether the advertisement at the second scheduler controller is stale or active;
    determining, at a first scheduler of the first scheduler controller, virtual resource placements based on the advertisement if the advertisement at both the first scheduler controller and the second scheduler controller are active, wherein the virtual resource placements comprise an assignment of the first host to create one or more virtual resources of the type of virtual resource; and
    aborting, by the first scheduler, the virtual resource placements if the advertisement at either or both the first scheduler controller and the second scheduler controller are stale.

2. The method of claim 1, further comprising:
    storing, by the first advertisement manager, advertisements of host capabilities received from the plurality of hosts in a hash table, wherein the advertisements of host capabilities received from the plurality of hosts are hashed by the type of virtual resource.

3. The method of claim 2, further comprising:
    determining, by the first advertisement manager, the virtual resource placements for the type of virtual resource using the hash table.

4. The method of claim 2, wherein the advertisements of host capabilities for a particular type of virtual resource are sorted by the number of instances of the particular type of virtual resource that the plurality of hosts are individually capable of creating.

5. The method of claim 1, further comprising:
    marking, by the first advertisement manager, the advertisement of host capabilities associated with the first host as active on the first scheduler controller after receiving the advertisement.

6. The method of claim 1, further comprising:
    acquiring, by the first advertisement manager, a lock on the advertisement associated with the first host identifying the type of virtual resource at the first scheduler controller.

7. The method of claim 6, further comprising:
    transmitting, by the first scheduler, an order to the first host to create one or more virtual resources of the type of virtual resource based on the determined virtual resource placements.

8. The method of claim 7, further comprising:
    releasing the lock in response to transmitting the order.

9. The method of claim 1, further comprising:
    marking, by the first advertisement manager, the advertisement associated with the first host identifying the type of virtual resource at the first scheduler controller as stale to prevent the advertisement from being consumed more than once.

10. The method of claim 1, further comprising:
    transmitting, by the first advertisement manager to the second scheduler controller, a request to acquire a lock on the advertisement associated with the first host identifying the type of virtual resource at the second scheduler controller.

11. The method of claim 10, further comprising:
    receiving a message from the second scheduler controller by the first advertisement manager that the lock has been acquired on the advertisement on the second scheduler controller.

12. The method of claim 10, further comprises:
    transmitting, by the first scheduler, an order to the first host to create one or more virtual resources of the type of virtual resource;
    transmitting, by the first advertisement manager to the second scheduler controller, a request to release the lock in response to transmitting the order; and
    transmitting, by the first advertisement manager to the second scheduler controller, a request to mark the advertisement on the second scheduler controller as stale.

13. A first scheduler controller for processing capabilities advertisements for virtual resource placement on a virtual cloud computing platform, the first scheduler controller comprising:
    at least one memory element;
    at least one processor coupled to the at least one memory element;

a first advertisement manager that when executed by the at least one processor is configured to:
  receive an advertisement of host capabilities from a first host among a plurality of hosts, wherein the advertisement received from a particular host identifies a type of virtual resource and a number of instances of the type of virtual resource that the first host is capable of creating;
  determine whether the advertisement at the first scheduler controller is stale or active; and
  query a second scheduler controller to determine whether the advertisement at the second scheduler controller is stale or active; and
a first scheduler that when executed by the at least one processor is configured to:
  determine virtual resource placements based on the advertisement if the advertisement at both the first scheduler controller and the second scheduler controller are active, wherein the virtual resource placements comprise an assignment of the first host to create one or more virtual resources of the type of virtual resource; and
  abort the virtual resource placements if the advertisement at either or both the first scheduler controller and the second scheduler controller are stale.

14. The first scheduler controller of claim 13, wherein the first advertisement manager that when executed by the at least one processor is further configured to store advertisements of host capabilities received from the plurality of hosts in a hash table, wherein the advertisements of host capabilities received from the plurality of hosts are hashed by the type of virtual resource.

15. The first scheduler controller of claim 14, wherein:
the first advertisement manager that when executed by the at least one processor is further configured to determine the virtual resource placements for the type of virtual resource using the hash table.

16. A computer-readable non-transitory medium comprising one or more instructions, for processing capabilities advertisements for virtual resource placement on a virtual cloud computing platform, that when executed on a processor configure the processor to perform one or more operations comprising:
  receiving, at a first advertisement manager of a first scheduler controller, an advertisement of host capabilities from a plurality of hosts, wherein the advertisement received from a first host identifies a type of virtual resource and a number of instances of the type of virtual resource that the first host is capable of creating;
  determining, by the first advertisement manager, whether the advertisement at the first scheduler controller is stale or active;
  querying, by the first advertisement manager, a second scheduler controller to determine whether the advertisement at the second scheduler controller is stale or active;
  determining, at a first scheduler of the first scheduler controller, virtual resource placements based on the advertisement if the advertisement at both the first scheduler controller and the second scheduler controller are active, wherein the virtual resource placements comprise an assignment of the first host to create one or more virtual resources of the type of virtual resource; and
  aborting, by the first scheduler, the virtual resource placements if the advertisement at either or both the first scheduler controller and the second scheduler controller are stale.

17. The computer-readable non-transitory medium of claim 16,
the one or more operations further comprise acquiring, by the first advertisement manager, a lock on the advertisement associated with the first host identifying the type of virtual resource at the first scheduler controller.

18. The computer-readable non-transitory medium of claim 16, wherein the one or more operations further comprise:
  marking, by the first advertisement manager, the advertisement associated with the first host identifying the type of virtual resource at the first scheduler controller as stale to prevent the advertisement from being consumed more than once.

19. The computer-readable non-transitory medium of claim 16, wherein the one or more operations further comprise:
  transmitting, by the first advertisement manager to the second scheduler controller, a request to acquire a lock on the advertisement associated with the first host identifying the type of virtual resource at the second scheduler controller.

20. The computer-readable non-transitory medium of claim 19 wherein the one or more operations further comprise:
  transmitting, by the first scheduler, an order to the first host to create one or more virtual resources of the type of virtual resource;
  transmitting, by the first advertisement manager to the second scheduler controller, a request to release the lock in response to transmitting the order; and
  transmitting, by the first advertisement manager to the second scheduler controller, a request to mark the advertisement on the second scheduler controller as stale.

* * * * *